April 29, 1969     C. F. BOESTER     3,440,669
HOUSEHOLD TOILET WASTE DISPOSAL UNIT AND METHOD
Filed April 3, 1967
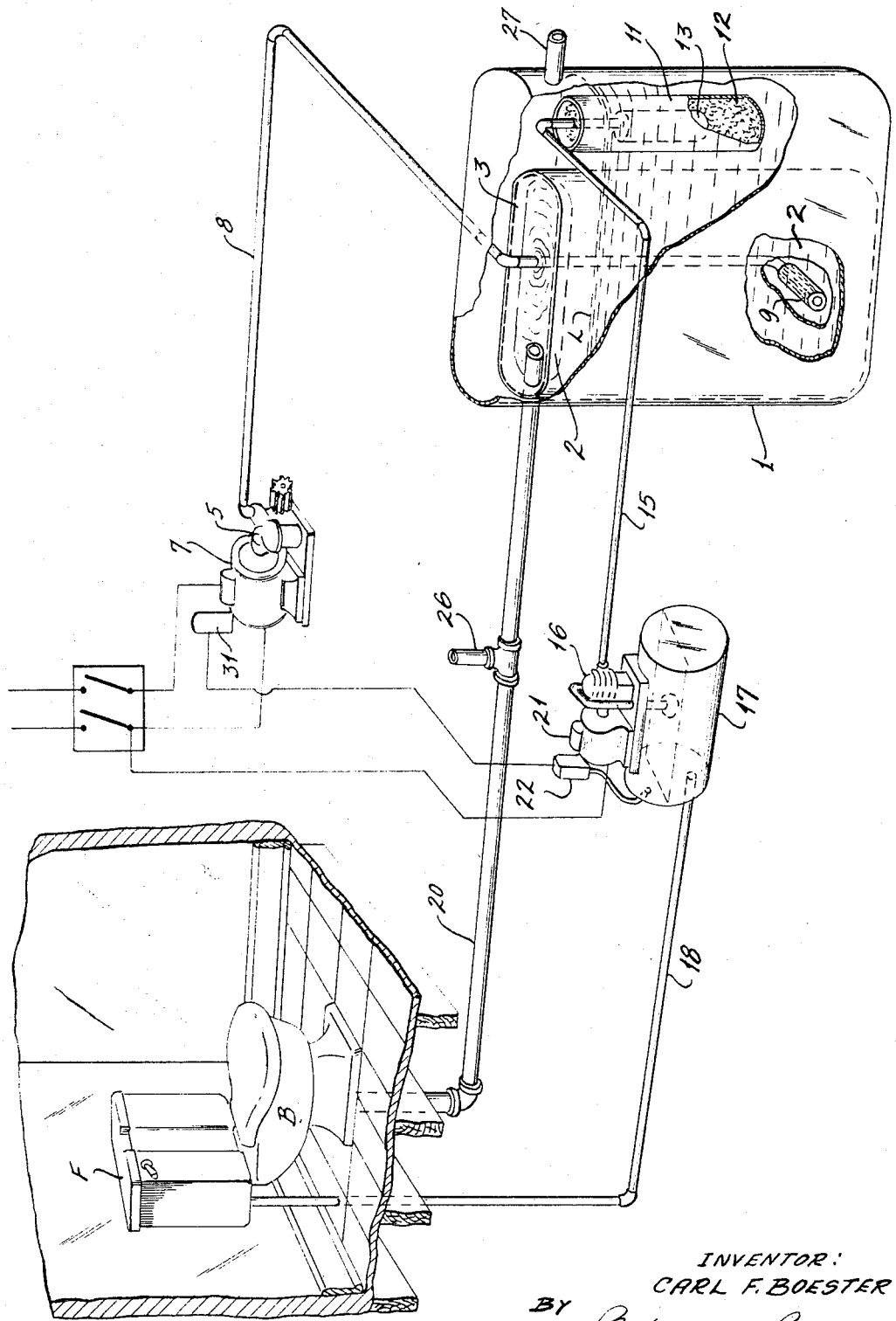
INVENTOR:
CARL F. BOESTER
BY Bedell and Burgess
ATTORNEYS

United States Patent Office 3,440,669
Patented Apr. 29, 1969

3,440,669
HOUSEHOLD TOILET WASTE DISPOSAL
UNIT AND METHOD
Carl F. Boester, 1129 S. 17th St.,
Arlington, Va. 22202
Filed Apr. 3, 1967, Ser. No. 627,725
Int. Cl. *1/00, 3/00, 5/00*
U.S. Cl. 4—10                5 Claims

ABSTRACT OF THE DISCLOSURE

Apparatus for disposal of waste from a household toilet or the like in which flushing fluid is discharged from the toilet into a bag of filter material enclosed in a substantially larger capacity tank, including means aerating the contents of the filter bag, means for removing pigment from fluid in the tank exteriorly of the filter bag, and means for pumping treated fluid to the toilet flushing supply. The fluid pumping means is rendered inactive by failure of the aerating means.

---

The invention relates to the disposal of wastes in a household toilet system, without the need for a fresh water supply for each of successive flushings, by recirculating a flushing fluid through the system and treating the fluid for the removal of odor and pigment, thereby eliminating the need for a sewer or a fluid absorption field in the ground.

The main objects of the invention are to treat and dispose of waste effectively, to supply safe, clarified inoffensive effluent to the toilet flush box and bowl; to conserve household consumption of water by avoiding repeated demand for fresh flushing water for toilets as required in ordinary flushing operations; and to eliminate the necessity and expense of using a sewer or a septic tank.

The invention utilizes a nonclogging, self-cleaning plastic fibre filter bag into which toilet wastes are flushed from the toilet in the usual manner and the contents of the bag are thoroughly agitated and aerated and subjected to bacterial treatment and the liquid in the bag is filtered through the bag fabric into a surrounding tank of larger capacity in which the liquid outside the bag may be relatively quiescent and the liquid may be withdrawn from the tank as needed, through a pigment-removing clarifier and recirculated to a flush box by a pump driven by a motor controlled by a pressure switch on the pump.

In the accompanying drawing of apparatus, and wiring diagram, there is shown a main liquid-tight treatment tank 1 having a capacity of approximately 300 gallons. A filter bag 2 of woven and felted plastic, such as a nylon material, having a capacity of approximately 200 gallons is suspended about its upper margin 3 from the upper portion of the tank. The upper portion of the bag is closed off from the tank to prevent direct flow of the contents of the bag to the interior of the tank except through the bag fabric which filters out solid matter. The tank and bag are substantially but not completely filled with water to a level L near the upper portion of each.

A normally continuously-running air compressor 5 driven by a motor 7 discharges air under compression of about three pounds above atmosphere through a pipe 8 to a diffuser 9, positioned in the lower portion of the filter bag, at the rate of about one and one-half cubic feet per minute so as to vigorously agitate, aerate and comminute the contents of the bag and promote oxidation and aerobic bacterial action within the bag.

A clarifier device in tank 1, but outside of the filter bag, comprises a relatively small container or casing 11 of filter material similar to bag 2 and having a capacity on the order of two to five cubic feet and filled with a pigment-removing filter mass 12 such as activated charcoal packed around a porous stone 13.

A pipe 15 leads from the interior of stone 13 to a pump 16 which discharges into an airtight reservoir 17. A supply pipe 18 leads from the lower portion of the reservoir upwardly to flush box F associated with toilet bowl B from which drain 20 leads direct to bag 2. Pump 16 is driven intermittently by motor 21 controlled by a single pole pneumatic pressure switch 22 including a spring which closes the switch when pressure in reservoir 17 falls below a predetermined point (approximately 30 pounds). Following a flushing operation, the usual flush ball-actuated cock in the bottom of the flush box opens and allows flushing fluid to enter the box due to the pressure in reservoir 17. At the same time the drop in pressure in reservoir 17 causes switch 22 to close and starts pump 16. When the flush box float ball rises it closes the inlet and as ensuing pressure in the reservoir rises, switch 22 opens and cuts out motor 21 which stops pump 16.

The predetermined pressure of three pounds maintained in pipe 8 holds a single pole switch 31 closed against spring thrust. Switch 31 may be located on motor 7 or anywhere along pipe 8. If pressure in pipe 8 drops below the predetermined figure, switch 31 opens and motor 21 stops. Flushing fluid will not then be supplied from reservoir 17 to the flush box and this will direct attention to the need for repair or other attention to the air compressor or its energizing circuit. This will prevent the supply of flushing fluid from reservoir 17 to the flush box unless the fluid has been treated as described.

The apparatus described provides for continuous bacterial action in a closed system which does not require repeated constant renewal of flushing water from an external source. The fluid pumped from the tank to flush box F is clear of pigment that could color it as has characterized previous recirculating flush fluid systems. Such colored fluid is psychologically objectionable and renders such systems commercially defective irrespective of their practical and sanitary qualities.

In a system as described there occurs at all times within the filter bag and external to it both aerobic and anaerobic bacterial activity as long as waste products are in the system and oxygen via aeration is continuously available.

Added urine balances by volume the evaporation loss due to aeration, which will maintain a satisfactory volume of flushing fluid. Fresh water need only be supplied at long intervals, if at all, as when the system is drained.

The unit as described is efficient from a sanitation standpoint and is commercially acceptable and may compete economically with a septic tank installation, and also may be used in an area where the soil characteristics are such that a septic tank cannot be used satisfactorily.

The apparatus reduces total household water consumption used for all purposes to about one-half of what is used when waste is removed in the usual manner when a fresh supply of water is required for each flushing operation. In this respect the system is particularly advantageous wherever the area water supply is inadequate or there is a high expanding demand.

The system may include an inlet 26 for other household waste fluids such as is discharged from kitchen sink, wash basin and bath, in which case an excess overflow 27 from tank 1 to a drain field may be used but this would not necessitate a sewer or a septic tank.

The construction, arrangement and operation of the parts in the system may be varied substantially without departing from the spirit of the invention and the exclusive use of such modifications as come within the scope of the claims is contemplated.

What is claimed is:

1. In a household waste disposal apparatus, a tank for storing and treating flushing fluid,
   a filter bag within said tank with its upper end closed off from the remainder of the tank but having an inlet opening,
   a device including a pump discharging atmospheric air into the lower portion of said filter bag to agitate and aerate flushing fluid in said bag and comminute solids therein and promote action of bacteria therein,
   a pigment-removing clarifying device in said tank exteriorly of said filter bag and below the level of the top thereof,
   and a supply pipe and an associated pump controlled by pressure in the tank for conducting flushing fluid from said clarifying device to a flush box and associated toilet bowl above the level of said treatment tank and filter bag.

2. In a waste disposal apparatus according to claim 1 in which the tank as a whole has a capacity on the order of 300 gallons and the filter bag therein has a capacity of the order of 200 gallons, and the clarifying unit comprises a filter-like device comprising a casing enclosing a mass of approximately two to five cubic feet of activated charcoal packed about a porous stone to which the end of the flushing fluid supply pipe is attached.

3. A household toilet waste disposal system comprising the usual toilet bowl and associated flush box,
   a storage and treatment tank below the level of the toilet bowl,
   a bag of woven and felted filter material within said treatment tank and spaced from the walls thereof with its open end closed off from said treatment tank,
   a gravity discharge drain leading directly from said bowl to the interior of said bag,
   there being flushing fluid in said tank and bag having a level below the top of said bag,
   an aerating device discharging into the lower portion of said bag and agitating and effecting comminution of the contents thereof and promoting action of aerobic bacteria in said bag,
   a clarifier in said tank exteriorly of said bag and containing a pigment-extracting means,
   and a pump and supply line leading from said clarifier to said flush box for returning flushing fluid from said clarifier to said flush box.

4. A household toilet disposal system according to claim 3 in which the aerating device and fluid supply pipe are actuated by individual motors, each motor having an individual pressure switch, actuated by the pressure in the aerating discharge and the flushing fluid supply line respectively, and opening the supply pipe motor switch if the aerating device pressure fails.

5. The method of disposing of household toilet waste which comprises fluid flushing contents of a toilet bowl into a closed filter bag containing aerobic bacteria and continuously aerating and agitating the contents of said bag,
   filtering the flushing fluid through the bag fabric into a tank surrounding the bag,
   intermittently withdrawing the filtered fluid from the tank solely through an activated-charcoal, pigment-removing medium and utilizing such withdrawn fluid solely to again flush contents of the toilet bowl into the filter bag.

References Cited

UNITED STATES PATENTS

| 1,303,358 | 5/1919 | Montgomery | 4—10 |
|---|---|---|---|
| 2,798,227 | 7/1957 | Boester | 4—10 |
| 2,798,228 | 7/1957 | Boester | 4—10 |
| 2,858,939 | 11/1958 | Corliss | 4—142 |
| 3,005,205 | 10/1961 | Breen | 4—115 |
| 3,051,315 | 8/1962 | Boester | 210—15 |
| 3,135,686 | 6/1964 | Campbell et al. | 210—15 |
| 3,210,053 | 10/1965 | Boester | 261—6 |
| 3,342,337 | 9/1967 | Reid | 4—1 |

LAVERNE D. GEIGER, *Primary Examiner.*

H. K. ARTIS, *Assistant Examiner.*

U.S. Cl. X.R.

210—220, 15; 4—115